United States Patent [19]

Sugiyama

[11] Patent Number: 4,708,695
[45] Date of Patent: Nov. 24, 1987

[54] AUTOMATIC TENSION ADJUSTING MECHANISM FOR WINDING AND TRANSMITTING DEVICE FOR AUTOMATIC DOOR

[75] Inventor: Kiyoaki Sugiyama, Akashi, Japan
[73] Assignee: Nippon Air Brake Co., Ltd., Kobe, Japan
[21] Appl. No.: 799,105
[22] Filed: Nov. 18, 1985
[30] Foreign Application Priority Data Aug. 10, 1985 [JP] Japan .................. 60-123427[U]

[51] Int. Cl.$^4$ ............................................. F16H 7/14
[52] U.S. Cl. ..................................... 474/101; 474/113
[58] Field of Search ............... 474/101, 112, 113, 114, 474/115

[56] References Cited

U.S. PATENT DOCUMENTS 4,454,236 6/1984 Foster et al. ..................... 474/101 X
4,557,707 12/1985 Thomey ............................ 474/101
4,583,961 4/1986 Kawasawa et al. ............. 474/114 X

*Primary Examiner*—Stephen J. Novosad
*Assistant Examiner*—Matthew Smith
*Attorney, Agent, or Firm*—Oblon, Fisher, Spivak, McClelland, & Maier

[57] ABSTRACT

An automatic tension adjusting mechanism for a winding and transmitting device for an automatic door includes a base fixed in a casing; a mount for a transmission wheel around which a belt is wound; the mount being disposed on the base slidably in the right and left directions where the mount forces the belt to be strained and relaxed, and being resiliently energized at all times in one of the directions where the mount forces the belt to be strained; a saw-toothed stop part provided on the mount and adapted to extend in the right and left directions; and an engagement piece provided on the base and adapted to be moved between an engagement starting position with the stop part and a disconnection position from the stop part; a spring between the base and the engagement piece for energizing the engagement piece in a direction where the engagement piece is engaged with the stop part; a tapped hole made in one of the members of the base and the mount; and a bolt screwed into the tapped hole. Two locking states are made selectable: one is a first locking state wherein the bolt is tightened, whereby the engagement piece is fixed at the engagement starting position; the other is a second locking state wherein the engagement piece is fixed at the disconnection part. The bolt is loosened to set the engagement piece to an unlocked state, whereby the engagement piece is resiliently engaged with the stop part.

3 Claims, 9 Drawing Figures

AUTOMATIC TENSION ADJUSTING MECHANISM FOR WINDING AND TRANSMITTING DEVICE FOR AUTOMATIC DOOR

BACKGROUND OF THE INVENTION

1. Field of the Invention

The present invention relates to a mechanism for automatically adjusting the tension of a belt as a winding and transmitting device for automatic door wound around a driving side transmission wheel (sprocket, etc.) and a driven side transmission wheel (pulley, etc.)

2. Description of the Prior Art

As illustrated in FIG. 8, an automatic door comprises a driving side transmission wheel $P_1$ connected to a motor M, a driven side transmission wheel $P_2$ corresponding thereto, a belt V such as a V belt wound around the transmission wheels described above, a rail R, a traveling body C supported on the rail R, and door D mounted on the traveling wheel C to which the above described belt V is connected.

A belt V of such an automatic door is elongated with the lapse of time even if it is strained at first. In addition, there may be a case where the belt V is temporarily elongated upon starting or stopping the door D. Such elongation of the belt makes it impossible to smoothly open and close the door D. Accordingly, there have been proposed various mechanisms for allowing looseness of the belt following the elongation thereof to be automatically compensated for.

FIG. 9 shows a prior automatic tension adjusting mechanism disclosed in Utility Model Gazette No. 35644/78. The mechanism includes a base 30 fixed in a casing, a mount 31 for a transmission wheel $P_2$ around which a belt V is wound, a guide lever 32 for guiding a movement of the mount 31 so as to make the mount 31 slidable in the right and left directions where the mount forces the belt V to be strained and relaxed, a spring 33 for resiliently energizing the mount 31 at all times in a direction where the mount 31 forces the belt V to be strained, a stopper part 34 having a plurality of grooves in the base 30, a pawl 35 provided at an end part of the mount 31 and detachably fitted in the groove formed in the stopper part 34, and a tapped hole made in the mount 31 into which a bolt 36 is screwed.

A groove shape of the stopper part 34 is such specified that the mount 31 can be moved to the left in the figure when the pawl 35 remains fitted in the groove of the stopper part 34, but not moved to the right. Accordingly, with the bolt 36 loosened, the mount 31 is moved in the left direction in the figure due to resilient energization by the spring 33. This is a direction where the belt V is strained, so that the belt V can be prevented from being relaxed when it is elongated due to various causes. Further, provided that the pawl 35 of the mount 31 is lifted out of the groove formed in the stopper part 34 by tightening the bolt 36 to push against the base 30, the mount 31 can be moved to the right resisting to the energization by the spring 33 as shown by a virtual line in the figure. It is facilitated in the situation to wind the belt V around the transmission wheel P or remove it therefrom.

However, although in the prior automatic tension adjusting mechanism described above the mount 31 can be moved in the right direction when the bolt 36 has been tightened, it can not be fixed at an end point of the movement since the resilient energizing force by the spring 33 is always applied thereto. Thus, some locking mechanism is needed to achieve it. Namely, such a difficulty that the mount 31 can not be fixed at the end point of the movement thereof originates in that the prior mechanism illustrated in FIG. 9 has not such a locking mechanism.

OBJECT OF THE INVENTION

In view of the drawbacks with the conventional automatic tension adjusting mechanism, it is an object of the present invention to provide an automatic tension adjusting mechanism having a mount locking mechanism capable of fixing a mount with ease at an end point of the movement thereof after the mount is moved together with the transmission wheel in a direction where the belt is relaxed upon winding/removing the belt around/from the transmission wheel.

SUMMARY OF THE INVENTION

To achieve the above object, an automatic tension adjusting mechanism for a winding and transmitting device for automatic door according to the present invention has a base fixed in a casing and a mount for transmission wheels around which a belt is wound, the mount being disposed on the base slidably in the right and left directions where the mount forces the belt to be strained and relaxed and is resiliently energized at all times in a direction where the mount forces the belt to be relaxed, a saw-toothed stop part attached to the mount and adapted to extend in the above-described right and left directions, an engagement piece provided on the base and moved between an engagement position thereof with the stop part and a disconnection point therefrom, a spring interposed between the base and the engagement piece for energizing the engagement piece in a direction where the piece is engaged with the stop piece, and a tapped hole made in one member of the base or the mount, the arrangement being such that two locking states are made selectable between the stop part and the engagement piece: a first locking state to fix the engagement piece at the engagement position thereof with the stop part by tightening a bolt screwed into the tapped hole against the other member of the stop part or the mount and a second locking state to fix the engagement piece at the disconnection position thereof from the stop part, the engagement piece being resiliently engaged with the stop part by loosening the bolt to set the engagement piece to an unlocked state.

According to the automatic tension adjusting mechanism for a winding and transmitting device for automatic door described above, the engagement piece is moved with respect to the stop part to its disconnection position therefrom, and the bolt is tightened to fix the engagement piece at the disconnection position (second locking state). The mount for the transmission wheels is slided in a direction where the belt is relaxed, and with the bolt loosened the engagement piece is moved with respect to the stop part to an engagement starting position, and thereafter the bolt is again tightened to fix the engagement piece at the above-described position (first locking state). Hereby, the mount for the transmission wheels can be held at a position where the belt is relaxed. Accordingly, winding/removal of the belt around/from the transmission wheels can be effected.

In addition, provided that the bolt is loosened to set the engagement piece to an unlocked state after winding the belt around the transmission wheels is complete, the engagement piece and the stop part are resiliently engaged with each other, allowing the belt to be strained at all times.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 3 is a sectional view illustrating the same in the first locking state thereof;

FIG. 4 is a sectional view illustrating the same in an unlocked state thereof;

FIG. 5 is a sectional view illustrating the same in the second locking state thereof;

DESCRIPTION OF THE PREFERRED EMBODIMENT

Figure 1:
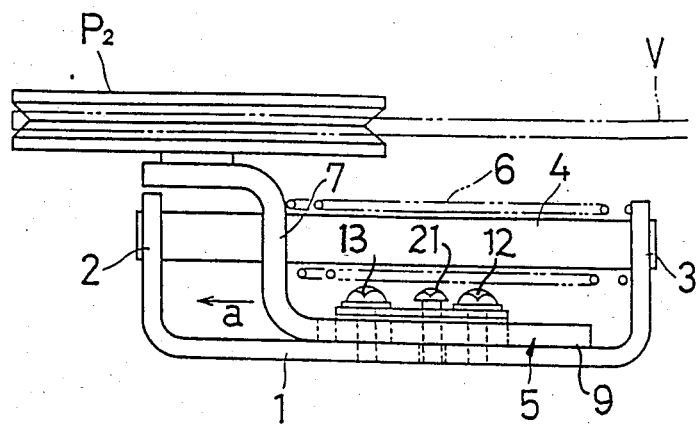
FIG. 1 is a plan view illustrating a first embodiment of an automatic tension adjusting mechanism for a winding and transmitting device for an automatic door according to the present invention.

A first embodiment of an automatic tension adjusting mechanism for a winding and transmitting device for an automatic door according to the present invention will be described below with reference to the accompanying drawings:

As shown in FIG. 1, a guide lever 4 is provided between upstanding parts 2, 3 provided on both ends of a base 1, and a mount 5 for a transmission wheel $P_2$ is guided by the guide lever 4, whereby the mount 5 is made slidable on the base 1 in the right and left directions in the figure, namely, directions where a belt V wound around the transmission wheel $P_2$ is strained or relaxed. A spring 6 fitted to and supported by the guide lever 4 is interposed in a pressed state thereof between the upstanding part 3 of the base 1 and an upstanding part 7 of the mount 5, by which the mount 5 is resiliently energized at all times in a direction (a) where the mount 5 forces the belt V to be strained.

Figure 2:
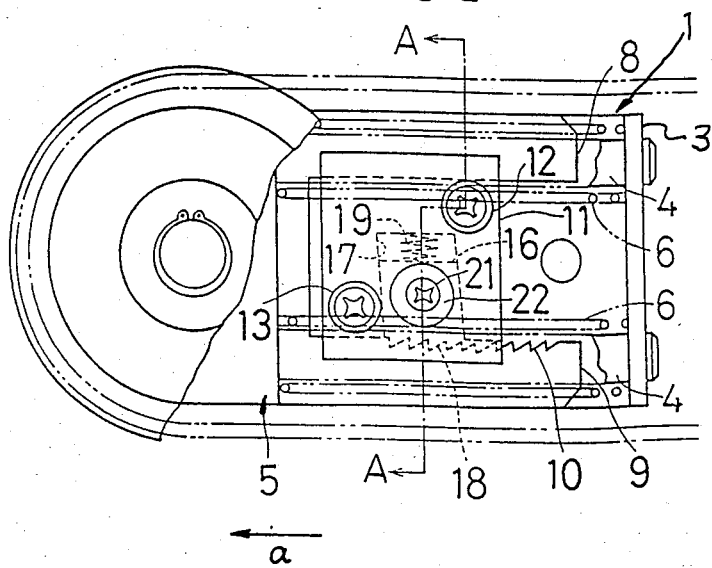
FIG. 2 is a side view illustrating a cutaway portion of the same.
Figure 3:
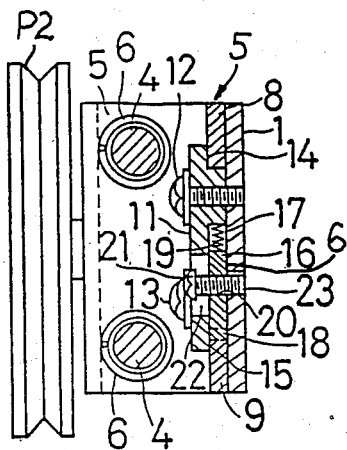
FIGS. 3 to 5 are sectional views illustrating the same along an A—A line of FIG. 2.
Figure 4:
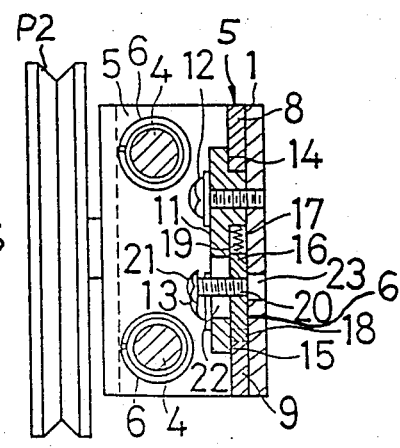
Figure 5:
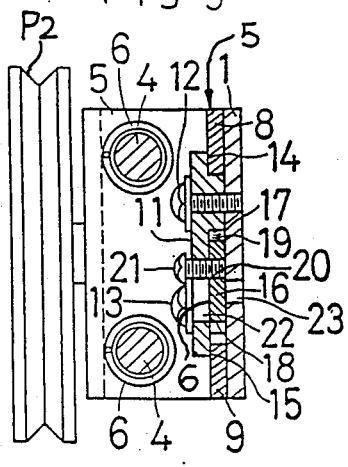

It is clear from FIG. 2 that the mount 5 has a pair of legs 8, 9 made slidable on the base 1, and a saw-toothed stop part 10 is provided on the inside of one of the legs 9. Designated at 11 is a retaining plate that partly constitutes the base 1, which is fixedly mounted on the base 1 by mounting bolts 12, 13 as shown in FIGS. 3 to 5. Stepped parts 14, 15 are provided on both ends of the retaining plate 11 for pressing the legs 8, 9 of the mount 5 onto the base 1 so as to allow them to slide on the base 1, while a recessed portion 17 is provided in the back surface of the retaining plate 11 for housing an engagement piece 16. The engagement piece 16, housed in the recessed portion 17 has a toothed part 18 engaged with the stop part 10 and is made movable within the recessed part 17 between the engagement starting position (refer to FIGS. 2 to 4) with the stop part 10 and the disconnection position thereof from the stop part 10 (refer to FIG. 5). The engagement piece 16 is ordinarily energized by a spring 19 interposed between it and the retaining piece 11 in a direction where it is engaged with the stop part 10. A tapped hole 20 is made in the engagement piece 16, and a bolt 21 screwed into the tapped hole 20 penetrates through a hole 22 drilled in the retaining piece 11. By contrast, a hole 23 is drilled in the base 1, which faces to the bolt 21 in a state where the engagement piece 16 is engaged with the stop part 10.

Operation of the automatic tension adjusting mechanism according to the present invention will be described below:

With the bolt 21 loosened, the engagement piece 16 is moved and the bolt 21 is made to face to the hole 23 in the base 1. Thereafter by tightening the bolt 21, the bolt 21 is forced to be fitted in the hole 23 in a state where the engagement piece 16 is engaged with the stop part 10, as shown in FIG. 3, to fix the engagement piece 16 on the base. In this case, the engagement piece 16 takes a first locking state, in which the mount 5 is prevented from sliding in both directions where the belt V is strained or relaxed. Accordingly, setting the engagement piece 16 to the first locking state after moving the mount 5 to the right in FIG. 1 causes the mount 5 to be fixed.

Winding/removal of the belt V around/from the transmission wheel $P_2$ can be effected with ease in this state. Although the first locking state can be maintained simply by pressing the bolt 21 onto the base 1, the above-described arrangement wherein the bolt 21 is adapted to be fitted in hole 23 further assures the effect described above.

Loosening the bolt 21, and bolt 21 slips out of the hole 23 as shown in FIG. 4, so that the first locking state is released. In such an unlocked state, the engagement piece 16 is engaged with the stop part 10 due to energization by the spring 19. Since the engagement piece 16 is saw-toothed, in this unlocked state, the mount 5, when pushed in one direction, is moved while forcing the engagement piece 16 to go back, resisting the energization by the spring 19. However, when the mount 5 is pushed in the other direction, it is prevented from being moved due to the engagement between the stop part 10 and the engagement piece 16. Accordingly, provided the stop part 10 is saw-toothed such that the engagement piece 16 is movable in a direction where the engagement piece 16 forces the belt V to be strained, the tension of the belt V can be automatically adjusted into a strained state at all times.

Successively, when with the bolt 21 loosened, the engagement piece 16 is moved to the disconnection point thereof from the stop part 10, and thereafter the bolt 21 is tightened and pushed onto the base 1, the engagement piece 16 is fixed at that position due to frictional force between the base 1 and the bolt 21, as shown in FIG. 5. This is a second locking state, in which the mount 5 can be freely moved in either of two directions where the belt V is strained or loosened. The second locking state can be further securely maintained provided a recessed portion or a hole is provided in the base 1 for allowing the bolt 21 to be fitted therein.

Figure 6:
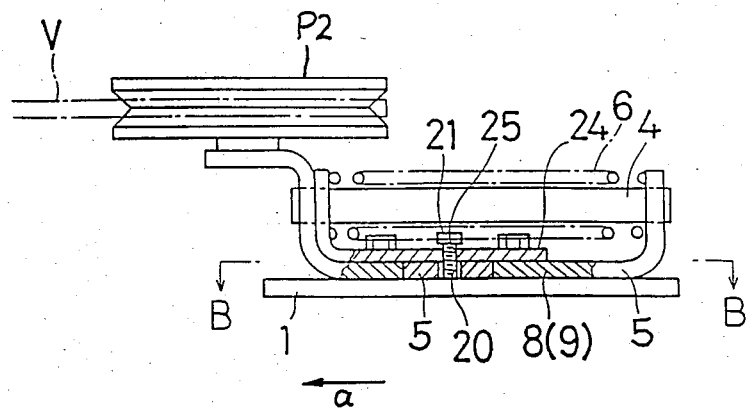
FIG. 6 is a plan view illustrating a cutaway portion of a second embodiment of an automatic tension adjusting mechanism.

A second embodiment of the automatic tension adjusting mechanism according to the present invention will be described with reference to FIGS. 6 and 7.

As illustrated in the figures, a mount 5 slidably disposed on a base 1 is pressed onto the base 1 by a cap plate 24 that partly forms the base 1. A tapped hole 25 is made in the cap plate 24, into which a bolt 21 is screwed. An engagement piece 27 is disposed on the base 1, and moved between an engagement starting position thereof with a saw-toothed stop part 10 on one of legs 9 of the mount 5 and a disconnection position thereof from the stop part 10. A tapped hole 28 is provided in the engagement piece 27. Designated at 29 is a plate spring for energizing the engagement piece 27 at all times in a direction where the engagement piece is engaged with the stop part 10. Other aspects of this arrangement are the same as those of the first embodiment. Accordingly, the same symbols are applied to the same elements as those shown in FIGS. 1 to 5 or corresponding ones thereto, and a detailed description will be omitted.

Figure 7:
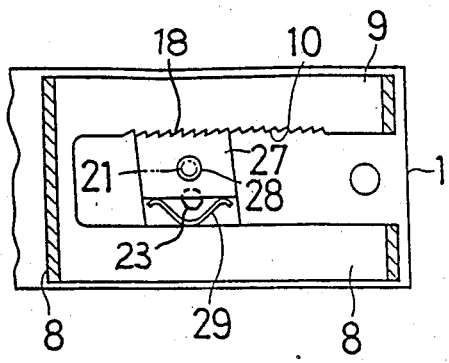
FIG. 7 is a sectional view illustrating the same as that in FIG. 6 along a B—B line of the same figure.
Figure 8:
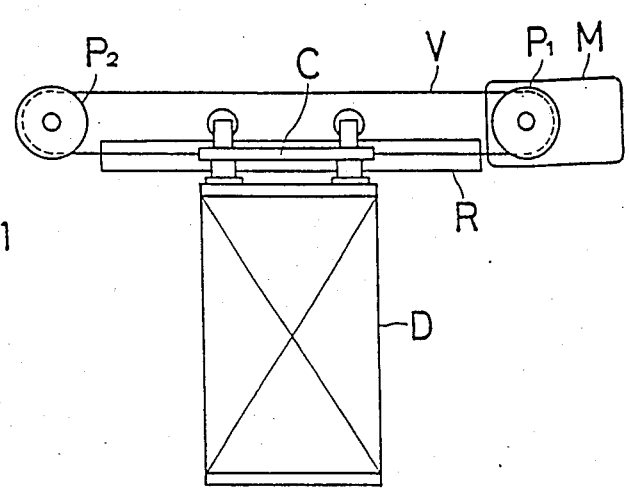
FIG. 8 is a schematical view of an automatic door.
Figure 9:
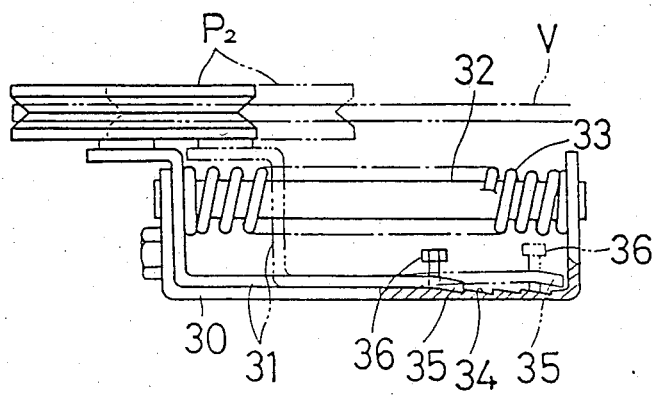
FIG. 9 is a plan view illustrating a prior automatic tension adjusting mechanism partly cut away.

According to the second embodiment, an unlocked state can be set by loosening the bolt 21 to permit it to be taken out from the tapped hole 28 in the engagement piece 27, while a first locking state can be set by tightening the bolt 21 to permit it to be protruded into the tapped hole 28 in the engagement piece 27, and a second locking state can be set by moving the engagement piece 27 downward in FIG. 7 after loosening the bolt 21 and tightening it at a disconnection point of the engagement piece 27 from the stop part 10.

According to the present invention, as described above, with operation of only one bolt, the mount can be easily set to a state in which the mount is allowed to be moved only in a direction where the belt is strained, a state in which it is prevented from being moved in two directions where the belt is strained or loosened, and a state in which it can be freely moved in either of the two directions described above. Accordingly, the tension of the belt produced with the elongation thereof can be not only adjusted, but also operability of a winding and transmitting device when the belt is wound/removed around the transmission wheel can be improved.

Although two preferred embodiments have been shown and described, it should be understood that many changes and modifications may be made therein without departing from the scope of the appended claims.

What is claimed is:

1. An automatic tension adjusting mechanism for a winding and force transmitting device, said mechanism comprising:
    (a) a base (1) having an at least generally planar sliding surface;
    (b) a mount (5) having an at least generally planar sliding surface in sliding contact with said at least generally planar sliding surface on said base (1), said mount (5):
        (i) being slidable in a first direction (a) relative to said base (1) and in a second direction, opposite to said first direction (a), relative to said base (1) and
        (ii) having a saw-toothed stop part (10) extending in a direction parallel to said first direction (a);
    (c) a pulley ($P_2$) carried by said mount (5) for rotation about an axis at least generally perpendicular to said at least generally planar sliding surfaces of said base (1) and said mount (5);
    (d) first means (9) biasing said mount (5) in said first direction (a) relative to said base (1);
    (e) an engagement piece (16, 27) having a saw-toothed stop part (18), said engagement piece (16, 27) being carried by said mount (5) and being movable relative thereto between a first position in which said saw-toothed stop part (18) on said engagement piece (16, 27) engages said saw-toothed stop part (10) on said mount (5), permitting relative movement between said engagement piece (16, 27) and said mount (5) in said second direction but preventing relative movement between said engagement piece (16, 27) and said mount (5) in said first direction (a), and a second position in which said saw-toothed stop part (18) on said engagement piece (16, 27) does not engage said saw-toothed stop part (10) on said mount (5), permitting relative movement between said engagement piece (16, 27) and said mount (5) in both said first direction (a) and said second direction;
    (f) second means (19) biasing said saw-toothed stop part (18) on said engagement piece (16, 27) toward engagement with said saw-toothed stop part (10) on said mount (5);
    (g) two holes (23) in one of said base (1) and said engagement piece (16, 27);
    (h) a threaded hole (20, 28) in the other of said base (1) and said engagement piece (16, 27) in position to align with one or the other of said two holes (23) in one of said base (1) and said engagement piece (16, 27) when said engagement piece (1, 27) is in its first and second positions, respectively; and
    (i) a bolt (21) threaded into said threaded hole (20, 28), said bolt (21) being sized, shaped, and positioned to be received in one or the other of said two holes (23),
    whereby three states are selectable, a first locking state wherein said engagement piece (16, 27) is locked in its first position, a second locking state wherein said engagement piece (16, 27) is locked in its second position, and an unlocked state wherein said engagement piece (16, 27) is movable relative to said mount (5) against the bias of said second means (19).

2. An automatic tension adjusting mechanism as recited in claim 1 wherein said two holes (23) are in said base (1) and said threaded hole (20) is in said engagement piece (16).

3. An automatic tension adjusting mechanism as recited in claim 1 wherein said two holes (23) are in said engagement piece (27) and said threaded hole (28) is in said base (1).